United States Patent [19]

Baldwin et al.

[11] Patent Number: 5,878,417

[45] Date of Patent: Mar. 2, 1999

[54] METHOD AND APPARATUS FOR NETWORK SECURITY IN BROWSER BASED INTERFACES

[75] Inventors: Wayne Ross Baldwin, Cedar Park; Carol Sue Christensen, Austin; Robert Kimberlin Foster, Austin; Athanasios Gaitatzes, Austin; Sharad Janardhan Naik, Austin; Richard Dennis Talbot, Austin, all of Tex.

[73] Assignee: International Business Machines Corporation, Armonk, N.Y.

[21] Appl. No.: 753,083

[22] Filed: Nov. 20, 1996

[51] Int. Cl.⁶ .................................................. G06F 17/30
[52] U.S. Cl. ........................ 707/10; 707/200; 395/187.01
[58] Field of Search ................ 707/10, 200; 395/187.01

[56] References Cited

U.S. PATENT DOCUMENTS

| | | |
|---|---|---|
| 5,155,827 | 10/1992 | Ghering . |
| 5,319,776 | 6/1994 | Hile et al. . |
| 5,359,659 | 10/1994 | Rosenthal . |
| 5,412,717 | 5/1995 | Fischer . |
| 5,421,006 | 5/1995 | Jablon et al. . |
| 5,454,000 | 9/1995 | Dorfman . |
| 5,550,984 | 8/1996 | Gelb . |
| 5,623,600 | 4/1997 | Ji et al. ............................... 395/197.01 |
| 5,701,451 | 12/1997 | Rogers et al. ............................ 707/10 |
| 5,708,780 | 1/1998 | Levergood et al. ............... 395/200.59 |
| 5,721,908 | 2/1998 | Lagarde et al. ............................ 707/10 |
| 5,724,425 | 3/1998 | Chang et al. ............................... 380/25 |
| 5,732,216 | 3/1998 | Logan et al. ........................ 395/200.33 |
| 5,732,219 | 3/1998 | Blumer et al. ...................... 395/200.57 |
| 5,734,831 | 3/1998 | Sanders ............................... 395/200.53 |
| 5,737,533 | 4/1998 | De Hond ............................ 395/200.49 |
| 5,737,560 | 4/1998 | Yohanan ................................... 395/349 |
| 5,737,592 | 4/1998 | Nguyen et al. ............................... 707/4 |

*Primary Examiner*—Wayne Amsbury
*Attorney, Agent, or Firm*—David A. Mims, Jr.

[57] ABSTRACT

A method and apparatus for improving security for a workstation accessing network resources through a web browser interface. A three step procedure is provided on the workstation for testing the origin and filetype extensions of command files, retrieved by a web browser, to determine whether they may be executed on the workstation. Step one of the invention consists of creating a non-standard command filetype extension on the workstation to be protected. This is followed by step two which isolates specific network or system resources for all approved command files. Finally, step three protects the command file contents and subdirectory locations on the protected workstation. The invention grants execute permission for an application file command files only when all three conditions of the above steps are met.

12 Claims, 2 Drawing Sheets

METHOD AND APPARATUS FOR NETWORK SECURITY IN BROWSER BASED INTERFACES

FIELD OF THE INVENTION

The present invention relates to data processing systems, and more particularly, to enhancing the security and integrity of computer workstations attached to computer networks against corruption by hostile or destructive virus applications.

BACKGROUND OF THE INVENTION

Network computing has become a major technical focus and business strategy for many software development companies. This is due in part to the phenomenal growth of Internet-based environments and users' unquenchable thirst for knowledge. Web browsers, such as the Netscape Navigator produced by Netscape Communications Corporation, are now configured to immediately recognize, download (from the network or user's hard file) and launch software applications from a user's workstation. Accompanying this ability to access information in the Internet-based environment are problems associated with protecting software assets on the workstation from hostile or destructive virus applications.

A software or computer virus is a special piece of program code that exists within, or infects, an otherwise normal computer program. When an infected application program is executed, the viral code seeks out other programs within the computer workstation and replicates itself. Infected programs may exist anywhere in the computer workstation including the operating system itself, and if undetected, can have devastating effects such as interfering with system operations or destroying data stored within the workstation.

A number of prior art techniques have been devised to address the detection and prevention of hostile or destructive virus applications. One approach uses a separate program to search or scan a computer's memory and disk storage for the characteristic pattern or signature of known viruses. One problem with this approach is the fact that it frequently depends on the computer user to manually invoke the scanning software. Another problem with this approach is the unacceptable amount of time the user must wait while the workstation is scanned.

Another prior art technique detects alteration of a program by calculating a checksum value for the application program under examination, and comparing it to a known checksum value of the original pristine version of the application program. If the program being examined has been infected by a computer virus, or otherwise altered, the checksum value of the program will have been changed as well. This technique suffers from the limitations requiring the user maintain the value of the checksum for the original pristine value (if known), and invoking the checksum program to perform the examination.

Still another prior art procedure halts the operation of a computer workstation when an executable file is detected and an inquiry is made to the computer user whether to execute an application file. The procedure changes the file extension for the executable file if the user indicates that the application file should not be executed. One problem with this procedure is that the user, who may not know the source of the executable file, must predict the effect of the executable file if executed on the workstation.

Consequently, it would be desirable to provide network security for a web browser-based interface to prevent the execution of hostile or destructive virus applications on a computer workstation connected to a network.

SUMMARY OF THE INVENTION

This invention relates to a method and apparatus for improving security for a workstation accessing network resources through a web browser interface. A procedure is provided on the workstation for testing the origin and filetype extensions of command files, retrieved by a web browser, to determine whether they may be executed on the workstation. Step one of the invention consists of creating a non-standard command filetype extension on the workstation to be protected. Step two consists of isolating specific network or system resources for all approved command files, and step three protects the command file contents and sub-directory locations on the protected workstation. The invention grants execute permission for an application file only when all three conditions described in the above steps are met.

DETAILED DESCRIPTION OF THE EMBODIMENTS

Figure 1:
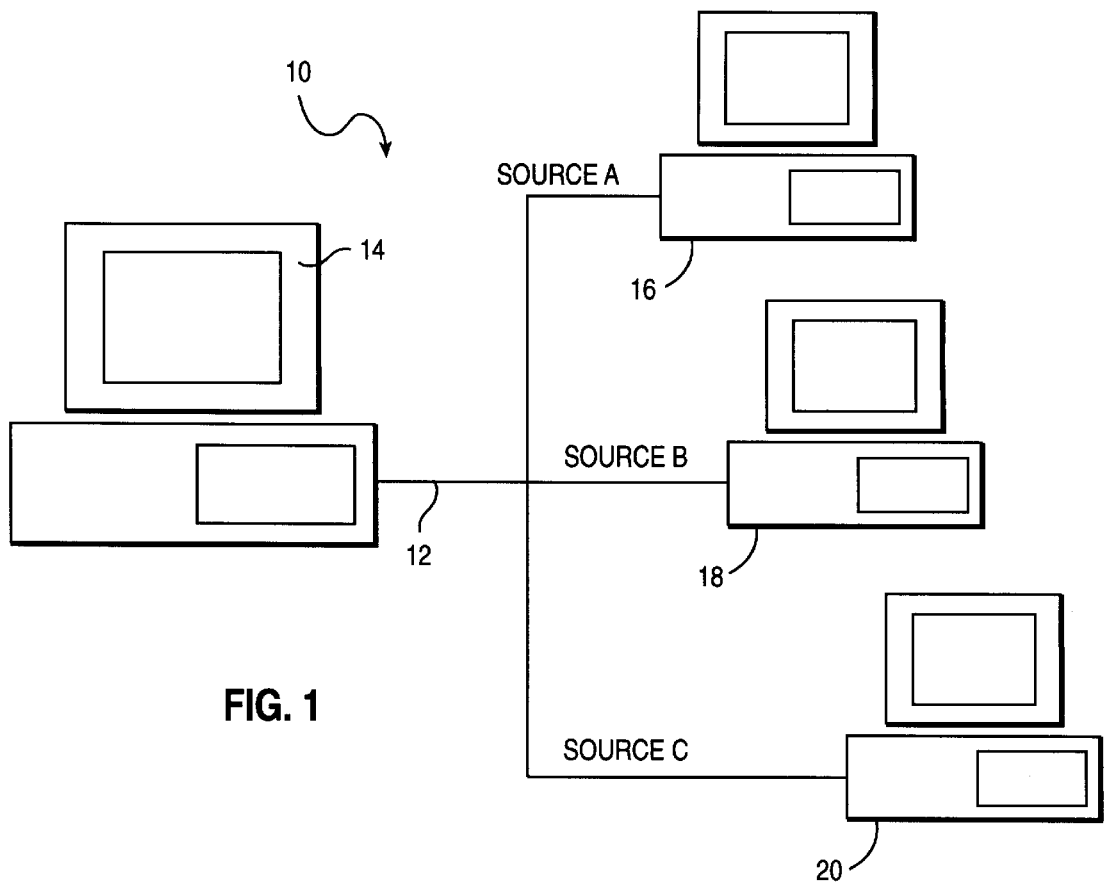
FIG. 1 is an illustrative embodiment of a network operating environment in accordance with the present invention.

This invention provides a method and apparatus for protecting software assets on a computer workstation from hostile or destructive virus applications. The invention is especially applicable for use in a common user interface which would use, for example, a world-wide web browser and Hypertext Markup Language (HTML) to access many different types of applications. Standard web browsers, such as the Netscape Navigator, when used as a primary interface are configured to immediately recognize, download (from a network or a user's hard file) and launch applications. Standard web browsers interpret and handle files based on a filetype extension. For example, a file named "index.html" is interpreted as an HTML document and is presented by the browser using a pre-programmed HTML interpreter. Likewise, a file named "movie.mpeg" is interpreted as a Motion Picture Expert Group (MPEG) movie file. The browser searches configuration files to determine how to handle the file and, normally, launches a media player to playback the content of the "movie.mpeg" file. The web browser also handles command scripts based on filetype extensions. Using universally recognized filetype extensions within the browser's configuration provides a convenient tool for handling complex setup and execution commands for almost any combination of operating system commands or application calls such as the following setup routine for a UNIX applications.

```
cd /appropriate/subdirectory
./test_for_appropriate_system_settings
. /usr/lpp/bin/run_appropriate_setup_sequence
./launch_application parm_1 parm_2 parm_n
```

This setup and initialization sequence requires the use of command scripts (or batch files) rather than simple, single line commands. For both single line and complex command files, however, the web browser must recognize and provide execute authority to these executables or command files. An executable, as used in this invention, is a program/command that specifies one or more actions to be taken by computer at execution time. Enabling a web-browser to load and execute these applications, also enables the browser to load and execute other applications with these common command filetype extensions. This configuration scenario creates an accidental exposure, however, by enabling the web browser to recognize, download onto the user's system and immediately execute any file with this filetype extension on the user's system. This configuration scenario also creates a more significant security exposure to hostile or destructive viruses if the user encounters a hostile command file on an internet-based web site. For example, a command file which contains the following simple Advanced Interactive Executive (AIX) command, "rm *", would cause a severe and unexpected loss of information on the end user's system. The invention, which protects the workstation from destructive commands including any command string which modifies the user's file system, will now be explained in detail using FIGS. 1–5.

Referring now to FIG. 1, there is shown a pictorial representation of a network operating environment 10 where the invention may be practiced. A plurality of workstations 14–20 are interconnected by a network buss 12. Workstations 14–20 may be Risc System/6000 (RS/6000) workstations manufactured by the IBM Corporation and containing multiple I/O storage devices, including a diskette device and floppy diskette upon which the software of this invention may be loaded. Security for user's workstation 14 includes protection from networked resources including any local devices, such as a hard file, or networked system resources available to the user. User's workstation 14 tests the origin and filetype extension of command files retrieved by a web browser (not shown) resident on workstation 14 to determine execute permission, and acknowledges only command files from a valid origin. Workstation 16 is a remote file system containing standard command file extensions. Workstation 18 is also a remote file system which contains command files with an "approved" network address and filetype extensions. Workstation 20 is a remote file system with an unacceptable network address. This invention causes user's workstation 14 to test the origin and filetype extensions of command files from workstations 16–20, and acknowledges only the ones from valid origins (i.e., containing the approved network address and filetype extensions), namely workstation 18 in this example.

Figure 2:
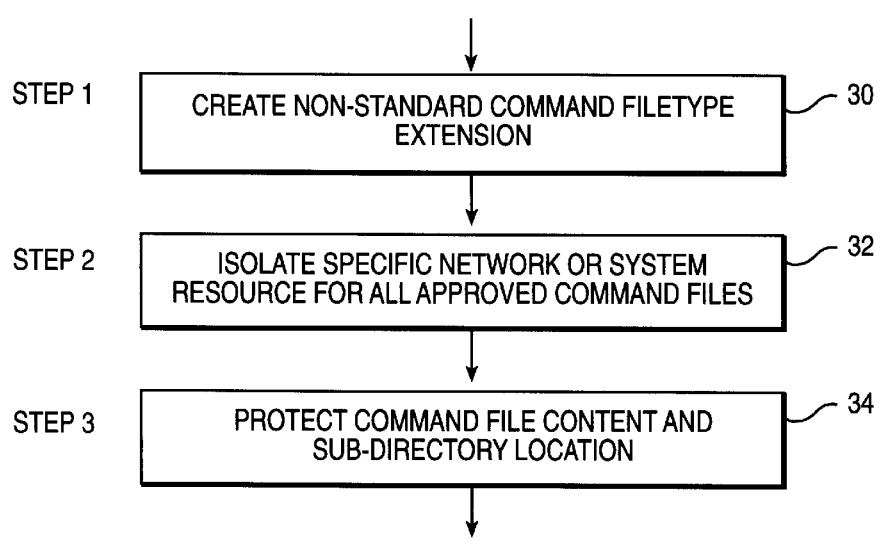
FIG. 2 is a block diagram of three conditions required to obtain execute permission for command files on a workstation as disclosed by this invention.

Referring now to FIG. 2, there is illustrated a block diagram showing the general overview of the invention. Execute permission is granted only in the event all three conditions are met for the following steps. Step 1 consists of creating a non-standard command filetype extension as shown in block 30. As shown in block 32, Step 2 consists of isolating specific network or system resource for all approved command files. Step 3 consists of protecting command file content and sub-directory location. Again, execute permission is passed only in the event all three conditions are met.

Figure 3:
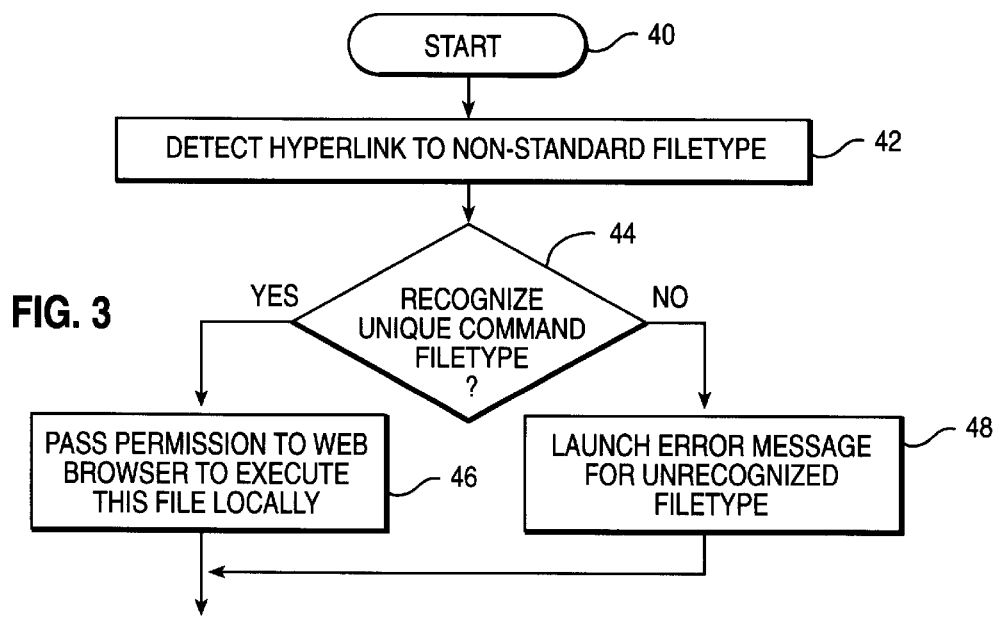
FIG. 3 is a flow diagram of a procedure for testing for unique filetypes on a workstation.

Referring now to FIG. 3, there is shown a flow diagram for testing for a unique filetype extension to avoid accidental exposure to launching executable files on a user's system using this invention per Step 1 of FIG. 2. The procedure starts at block 40 and proceeds immediately to block 42 to detect any hyperlinks to a non-standard filetype. A test is conducted at block 44 to determine if any unique command filetypes have been recognized. If YES, at block 46 the procedure passes permission to the web browser to execute the file locally that is undergoing examination. If NO, at block 48 the procedure launches an error message for an unrecognized filetype.

Figure 4:
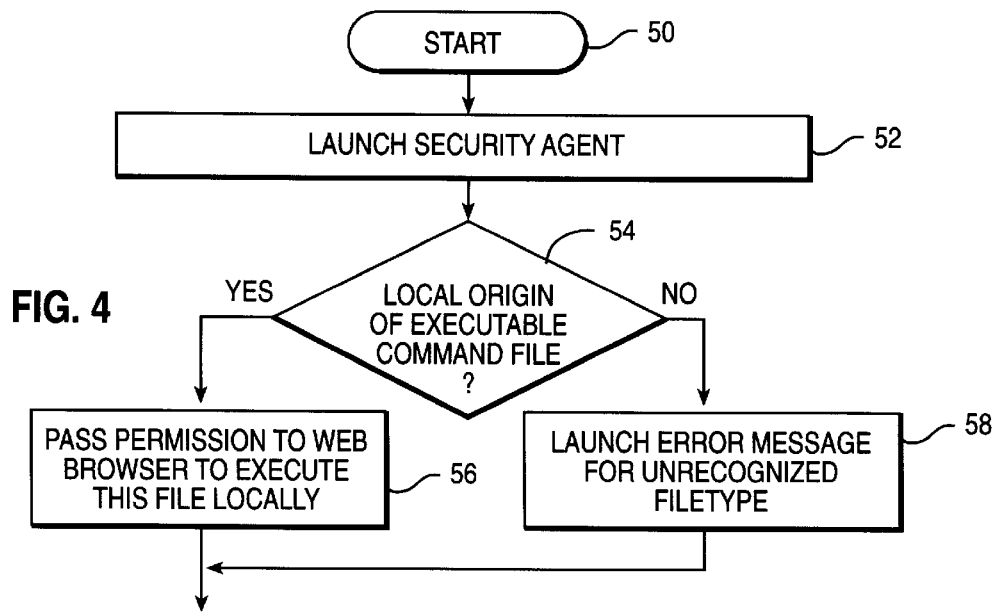
FIG. 4 shows a flow diagram describing the steps for testing the origin of executables on a workstation operation.

Referring now to FIG. 4, there is shown a flow diagram for testing the origin of an executable using this invention as shown in Step 2 of FIG. 2. In the preferred embodiment, this procedure is placed within the browser's configuration files and describes the browser link using the unique filetype extensions. One skilled in the art will appreciate that the browser provides execute authority only to command files with the unique extension from a unique location in the user's workstation. The procedure starts at block 50 and proceeds immediately to block 52 where it launches a security agent. The security agent is an application which test the contents of the executable file. At block 54, the procedure determines the local source location (i.e., examines the return address of the command) of an executable command file. If YES, at block 56 the procedure passes permission to the web browser to execute this file locally. If NO, at block 58 the procedure launches an error message for the unrecognized filetype. After testing the origin of the executables, this procedure passes execute permission only if the origin meets pre-defined source address requirements. Requirements may be based on high (local-remote) or low (source location and detailed sub-directory location) level screens to assign execute permission.

Figure 5:
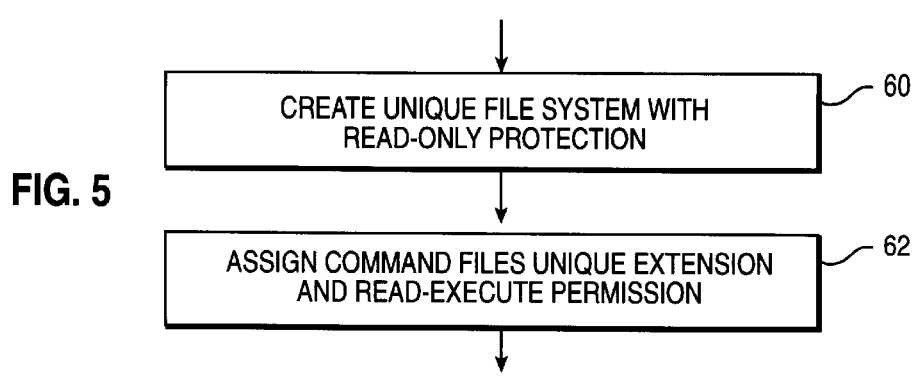
FIG. 5 is a block diagram for sub-directory and filetype protection as disclosed in this invention.

With reference to FIG. 5, there is shown a block diagram of the steps required to prevent unauthorized tampering with command file sub-directory locations and the contents in protected sub-directories per Step 3 of FIG. 2. At block 60, the procedure creates a unique file system in the workstation with read-only protection. In the preferred embodiment, non-standard filetype extensions are used instead of universally recognized filetype extensions. This isolates the command files on the user's workstation to support a specific application (i.e., "a welcome center"). For example, all of the files contained for an implementation of a welcome center are contained within unique sub-directories with relative sub-directory links within an HTML source as shown below:

```
/welcome
/welcome/art
/welcome/video
.
.
.
```

The procedure also assigns the command files unique extension and read-execute permission to prevent unauthorized tampering with sub-directories in the workstation as shown in block 62.

While the invention has been described with respect to a preferred embodiment thereof, it will be understood by those skilled in the art that various changes in detail may be made therein without departing from the spirit, scope, and teaching of the invention. Accordingly, the herein disclosed invention is to be limited only as specified in the following claims.

What we claim is:

1. A method, implemented in a computer system, for determining execution permission for an application program retrieved by a web browser within a client's workstation in a network operating environment, comprising the steps of:

creating a non-standard command filetype extension for all command files in said client's workstation in said network operating environment containing said application program;

creating a unique filetype extension in said client's workstation having protection and permission information for said application program, said unique file type extension different from said non-standard command filetype;

receiving at said client's workstation in said network operating environment said application program retrieved by said web browser;

testing the content and source of said application program received at said client's workstation for said unique filetype extension; and executing said application program at said client's workstation by said web browser based on said protection and permission information.

2. The method of claim 1, wherein the step of creating a unique filetype extension comprises the step of:

assigning read-only protection for said unique filetype extension in said client's workstation.

3. The method of claim 1, wherein the step of creating a unique filetype extension comprises the step of:

assigning a unique file extension to a command file of said application program in said client's workstation.

4. The method of claim 1, wherein the step of testing the context and source of said application program comprises the steps of:

determining if an executable command of said application file is of local origin; and passing permission to said web browser to execute said application file locally on said client's workstation.

5. An apparatus for determining execution permission for an application program retrieved by a web browser within a client's workstation in a network operating environment, comprising:

means for creating a non-standard command filetype extension for all command files in said client's workstation in said network operating environment containing said application program;

means for creating a unique filetype extension in said client's workstation having protection and permission information for said application program, said unique file type extension different from said non-standard command filetype;

means for receiving at said client's workstation in said network operating environment said application program retrieved by said web browser;

means for testing the content and source of said application program received at said client's workstation for said unique filetype extension; and means for executing said application program at said client's workstation by said web browser based on said protection and permission information.

6. The apparatus of claim 5, wherein the means for creating a unique filetype extension comprises:

means for assigning read-only protection for said unique filetype extension in said client's workstation.

7. The apparatus of claim 5, wherein the means for creating a unique filetype extension comprises:

means for assigning a unique file extension to a command file of said application program in said client's workstation.

8. The apparatus of claim 5, wherein the means for testing the context and source of said application program comprises:

means for determining if an executable command of said application file is of local origin; and means for passing permission to said web browser to execute said application file locally on said client's workstation.

9. A computer program product having a computer readable medium having computer program logic recorded thereon for determining execution permission for an application program retrieved by a web browser within a client's workstation in a network operating environment, comprising:

computer readable means for creating a non-standard command filetype extension for all command files in said client's workstation in said network operating environment containing said application program;

computer readable means for creating a unique filetype extension in said client's workstation having protection and permission information for said application program, said unique filetype different from said non-standard command filetype;

computer readable means for receiving at said client's workstation in said network operating environment said application program retrieved by said web browser;

computer readable means for testing the content and source of said application program received at said client's workstation for said unique filetype extension; and computer readable means for executing said application program at said client's workstation by said web browser based on said protection and permission information.

10. The computer program of claim 9, wherein the computer readable means for creating a unique filetype extension comprises:

computer readable means for assigning read-only protection for said unique filetype extension in said client's workstation.

11. The computer program of claim 9, wherein the computer readable means for creating a unique filetype extension comprises:

computer readable means for assigning a unique file extension to a command file of said application program in said client's workstation.

12. The computer program of claim 9, wherein the computer readable means for testing the context and source of said application program comprises:

computer readable means for determining if an executable command of said application file is of local origin; and computer readable means for passing permission to said web browser to execute said application file locally on said client's workstation.

* * * * *